United States Patent [19]

Ih et al.

[11] Patent Number: 4,775,972

[45] Date of Patent: Oct. 4, 1988

[54] OPTICAL FIBER COMMUNICATION FOR LOCAL AREA NETWORKS WITH FREQUENCY-DIVISION-MULTIPLEXING

[75] Inventors: Charles C. Ih, Newark, Del.; Charles K. Kao, Trumbull, Conn.

[73] Assignee: ITT Corporation, Defense Communications Division, Nutley, N.J.

[21] Appl. No.: 733,290

[22] Filed: May 10, 1985

[51] Int. Cl.⁴ .............................................. H04B 9/00
[52] U.S. Cl. ...................................... 370/3; 350/358; 455/619
[58] Field of Search ................ 455/619; 370/1, 2, 3, 370/121, 74; 350/358, 96.11, 96.12

[56] References Cited

U.S. PATENT DOCUMENTS

| | | | |
|---|---|---|---|
| 3,258,597 | 6/1966 | Forrester | 455/619 |
| 3,676,684 | 7/1972 | DeLange | 370/3 |
| 3,908,121 | 9/1975 | Riseberg et al. | 370/1 |
| 3,920,983 | 11/1975 | Scheafer et al. | 370/3 |
| 3,975,628 | 8/1976 | Graves et al. | 455/619 |
| 4,156,135 | 5/1979 | Miller, Jr. et al. | 455/619 |
| 4,206,347 | 6/1980 | Avicola et al. | 455/609 |
| 4,209,664 | 6/1980 | Hochrath | 370/74 |
| 4,318,058 | 3/1982 | Mito et al. | 350/96.11 |
| 4,468,766 | 8/1984 | Spezio | 455/619 |
| 4,503,403 | 3/1985 | Taylor et al. | 455/619 |
| 4,635,246 | 1/1987 | Taylor et al. | 455/617 |

FOREIGN PATENT DOCUMENTS

| | | | |
|---|---|---|---|
| 0115445 | 8/1984 | European Pat. Off. | |
| 0149838 | 11/1981 | Japan | 370/3 |
| 0149837 | 11/1981 | Japan | 370/3 |
| 2139443 | 11/1984 | United Kingdom | |
| 2142796 | 1/1985 | United Kingdom | 370/3 |

OTHER PUBLICATIONS

"Feasibility and Requirement for Dispersion Compensation in Coherent FOC", C. S. Ih, Optical Waveguide Sciences proceedings of the International Symposium 1983.

Izutsu et al., I.E.E.E. Journal of Quantum Electronics; "Integrated Optical SSB/Modulator/Frequency Shifter", vol. QE-17,-No. 11,-Nov. 1981; pp. 2225-2227.

Favve et al.; I.E.E.E. Journal of Quantum Electronics; "Progress Towards Heterodyne-Type Single-Mode Fiber Communication Systems; "vol. Qe-17, No. 6; Jun. 1981; pp. 897-899.

Primary Examiner— Griffin
Assistant Examiner—Leslie Van Beek
Attorney, Agent, or Firm—Robert A. Walsh; Thomas N. Twomey; Mary C. Werner

[57] ABSTRACT

A method and associated system for providing multi-channel transmission of digital and broadband video information in optical fiber communication for local area networks through frequency-division-multiplexing, comprising the steps of generating a plurality of closely spaced optical carrier wave pairs with the optical carrier waves within each optical carrier wave pair having a predetermined separation frequency between one another, assigning each of the plurality of optical carrier wave pairs to a predetermined frequency slot and optically combining the plurality of optical carrier wave pairs to provide a multiplexed optical output wave. Advantageously, in addition to direct detection the plurality of optical carrier wave pairs may be detected by opto-electronic heterodyne detection and/or incoherent optical-heterodyne detection to electronically recover the optical carrier wave pairs.

35 Claims, 5 Drawing Sheets

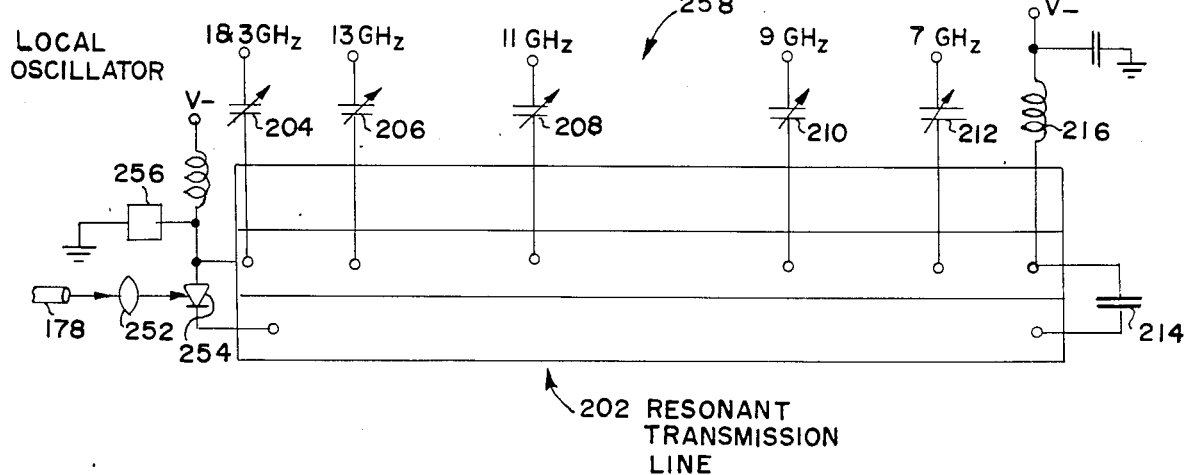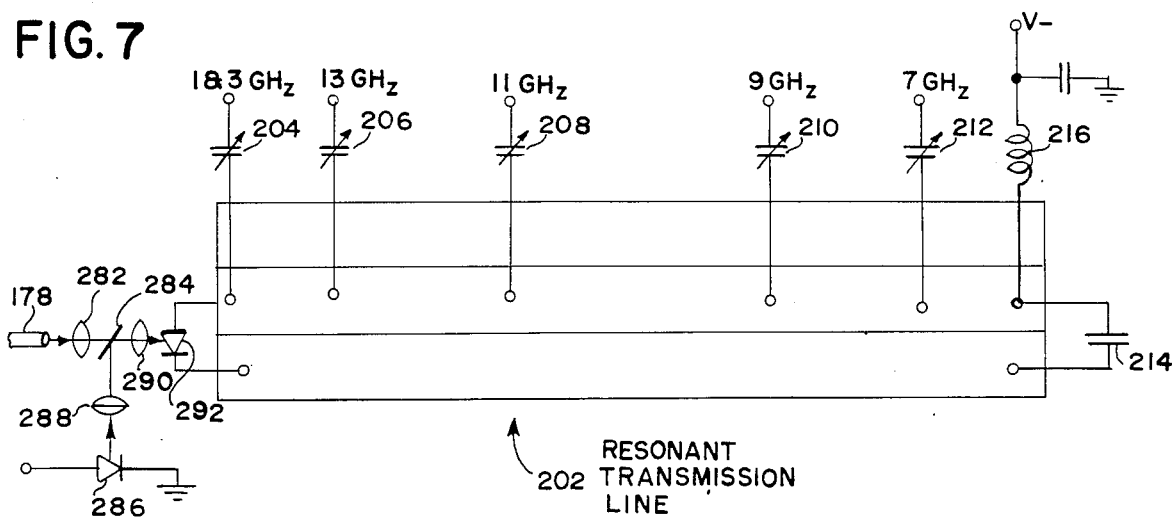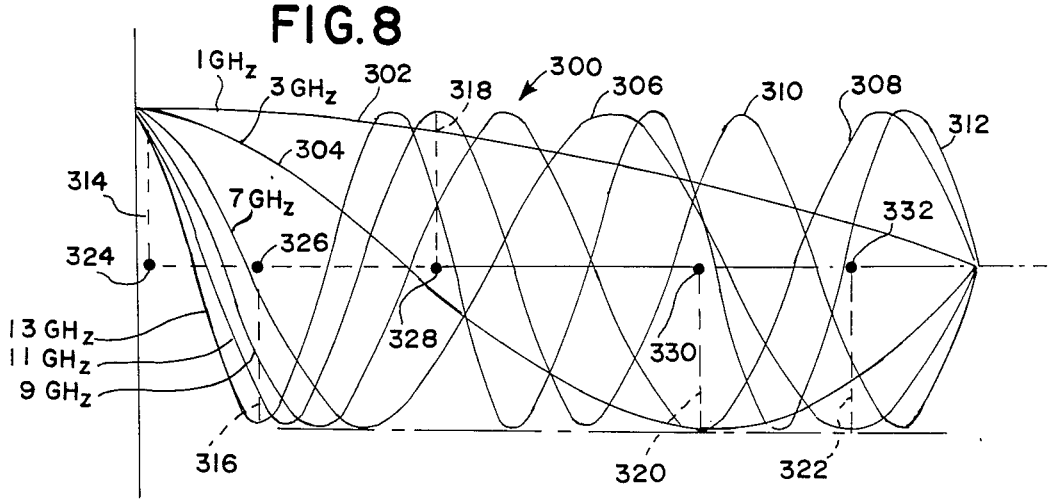

OPTICAL FIBER COMMUNICATION FOR LOCAL AREA NETWORKS WITH FREQUENCY-DIVISION-MULTIPLEXING

BACKGROUND OF THE INVENTION

The present invention relates to optical fiber communication, and more particularly to optical fiber communication for local area network (LAN) applications using frequency-division-multiplexing.

Optical fiber systems have not succeeded in providing multi-channel digital, audio, broadband video and facsimile transmission in an integrated LAN network. The present invention provides an integrated LAN network using optical fibers.

The transmission of video signals using digital techniques requires a very large bandwidth. Conventional fiber optic systems have bandwidth limitations due to non-linear distortion and therefore can readily be saturated for such applications. Further, conventional coaxial cable systems do not have the required bandwidth. Existing optical fiber LANs use time-division-multiplexing (TDM) to achieve multi-channel digital operation. Such systems lack the flexibility in transmitting analog and digital information simultaneously, particularly for real time broadband analog signals.

Conventional frequency-division-multiplexing (FDM) in optical fiber communication (OFC) utilizes a semi-coherent optical source which is directly intensity modulated by a multiplexed RF signal. Direct detection is employed to recover the RF signals. These RF signals up to several hundred megahertz are demodulated by standard RF techniques. This system has been widely used for multiple-channel video transmission normally over a distance of up to 10 kilometers. Because of serious intermodulations, such a system is normally implemented using FM modulated RF channels. This increases the complexity of the system and therefore the cost, and reduces the reliability of the system.

It is recognized for coherent optical fiber communication (OFC) that it is possible to use optical modulation techniques which allow either one of the sidebands or carrier to be suppressed to provide dispersion compensation. Such techniques include Time-Domain-Holography Modulation (TDHM) for analog transmission and Double-Beam Modulation (DBM) for digital transmission, see the article entitled, "Feasibility and Requirements For Dispersion Compensation in Coherent FOC," by C. S. Ih in Optical Waveguide Sciences-Proceedings of the International Symposium, held at Kweilin, People's Republic of China (PRC), June 20–23, 1983, Martinus Nijhoff Publishers, 1983.

Also U.S. Pat. No. 4,210,803, in the name of Charles C. Ih, issued July 1, 1980, discloses the use in optical fiber communication (OFC) of two or more substantially monochromatic optical beams having their frequencies interlocked to a preselected degree dependent upon the transmission service to be effected, one beam being reserved as the carrier or reference while the other beams are reserved as information beams upon which the individual electrical signals to be transmitted are modulated, and the implementation of this technique using integrated optics technology.

SUMMARY OF THE INVENTION

It is an object of the present invention to provide an optical fiber communication LAN having multi-channel digital and broadband video capability.

It is a further object of the present invention to provide multi-channel digital audio, broadband video and facsimile transmission in an integrated LAN network.

It is a further object of the present invention to provide an optical fiber communication LAN which is capable of transmitting audio, video and digital information simultaneously.

It is a still further object of the present invention to provide an optical fiber communication LAN which can be used in a two-way or broadcasting mode.

It is a still further object of the present invention to provide an optical fiber communication LAN which can be operated at relatively low bit rates while maintaining the ability to handle large amounts of information.

It is a still further object of the present invention to provide an optical fiber communication LAN which is capable of operating with existing cable LAN systems.

It is a still further object of the present invention to provide an optical fiber communication LAN capable of supporting graphic display on ordinary computer terminals.

It is a still further object of the present invention to provide an optical fiber communication LAN in which demultiplexing at the receiving end is completely electronic and therefore reliable and compact.

It is a still further object of the present invention to provide optical fiber communication LAN capable of providing a very high effective Bandwidth-Distance Product (BDP).

It is a still further object of the present invention to provide a fiber optical communication LAN having a reduced threshold of Stimulated-Brillouin-Scattering (SBS).

It is a still further object of the present invention to provide a fiber optical communication LAN which is compatible with conventional wavelength-division-multiplexing systems to further expand their information bandwidth.

It is a still further object of the present invention to provide an optical fiber communication LAN which is relatively simple to implement and can be implemented with low cost.

Briefly, in accordance with the present invention a method and associated system is disclosed for providing multi-channel transmission of digital and broadband video information in optical fiber communication for local area networks through frequency-division-multiplexing, comprising the steps of generating a plurality of closely spaced optical carrier wave pairs with the optical carrier waves within each optical carrier wave pair having a predetermined separation frequency between one another, assigning each of the plurality of optical carrier wave pairs to a predetermined frequency slot, and optically combining the plurality of optical carrier wave pairs to provide a multiplexed optical output wave. Advantageously, in addition to direct detection, the plurality of optical carrier wave pairs may be heterodyne detected by opto-electronic heterodyne detection and/or incoherent optical-heterodyne detection to electronically recover the optical carrier wave pairs.

BRIEF DESCRIPTION OF THE DRAWINGS

FIG. 6 is a top plan view in partial schematic of an FDM receiver in accordance with the present invention;

FIG. 7 is a top plan view in partial schematic of another embodiment of an FDM receiver in accordance with the present invention;

FIG. 8 is a graph illustrating the standing wave pattern for the different channel frequency assignments in FIG. 3.

DETAILED DESCRIPTION OF THE INVENTION

Figure 1:
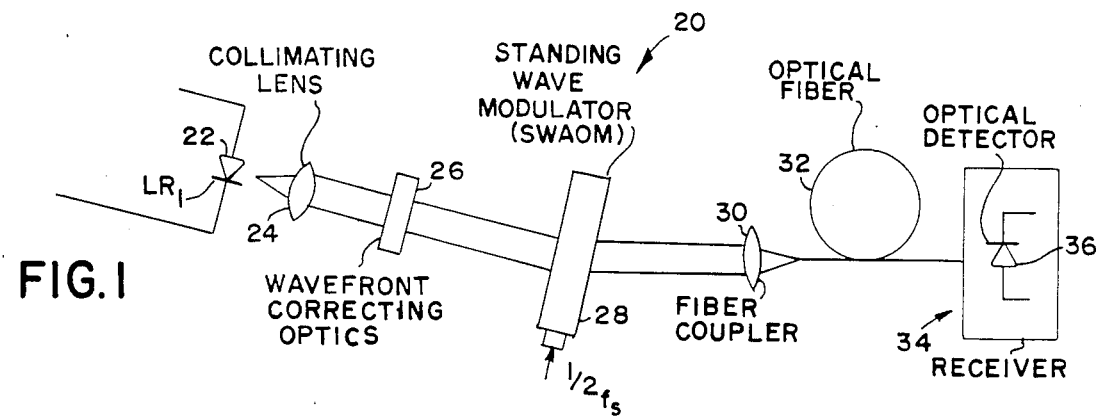
FIG. 1 is a schematic diagram of one embodiment of a Double-Beam-Modulator (DBM) for generating the optical carrier wave pairs of the present invention.

Referring to FIG. 1, a double-beam-modulator is generally illustrated at 20. A laser diode 22 is pulsed and/or analog modulated to generate an optical beam. A lens 24 collimates the laser beam output from the laser diode 22 and directs it through wavefront correcting optics (WCO) 26. The output from the wavefront correcting optics 26 is applied to a Standing-Wave-Acousto-Optical-Modulator 28 (SWAOM). The SWAOM 28 simultaneously up-shifts and down-shifts the frequency of the incoming laser beam to produce an optical carrier wave pair. The SWAOM 28 is driven at a frequency of ½ the subcarrier frequency of the laser beam so that the up-shifting and down-shifting results in an optical carrier wave pair having a frequency of $f_o+0.5f_s$ and $f_o-0.5f_s$ with respect to the frequency of the laser beam where $f_s$ is the subcarrier frequency and $f_o$ is the frequency of the laser. Thus, the difference in the frequency of the optical carrier wave pair determines the subcarrier frequency. The intensity of the resulting output beam is modulated at twice the driving frequency of SWAOM 28. The information is modulated directly on the laser beam by modulating the injection current applied to the laser diode 22. If a large signal to noise ratio (SNR) is required, an FM modulated signal can be used to modulate the laser diode 22. But, the original optical carrier frequency is suppressed by the SWAOM 28. The SWAOM 28 can produce subcarriers up to approximately 5 GHz. These frequencies are sufficient for practically all LAN applications. A fiber optic coupler such as a star coupler 30 couples the optical carrier wave pair to a single mode optical fiber 32 for transmission of the optical carrier wave pair to a receiver 34 which includes an optical detector 36.

Figure 2:
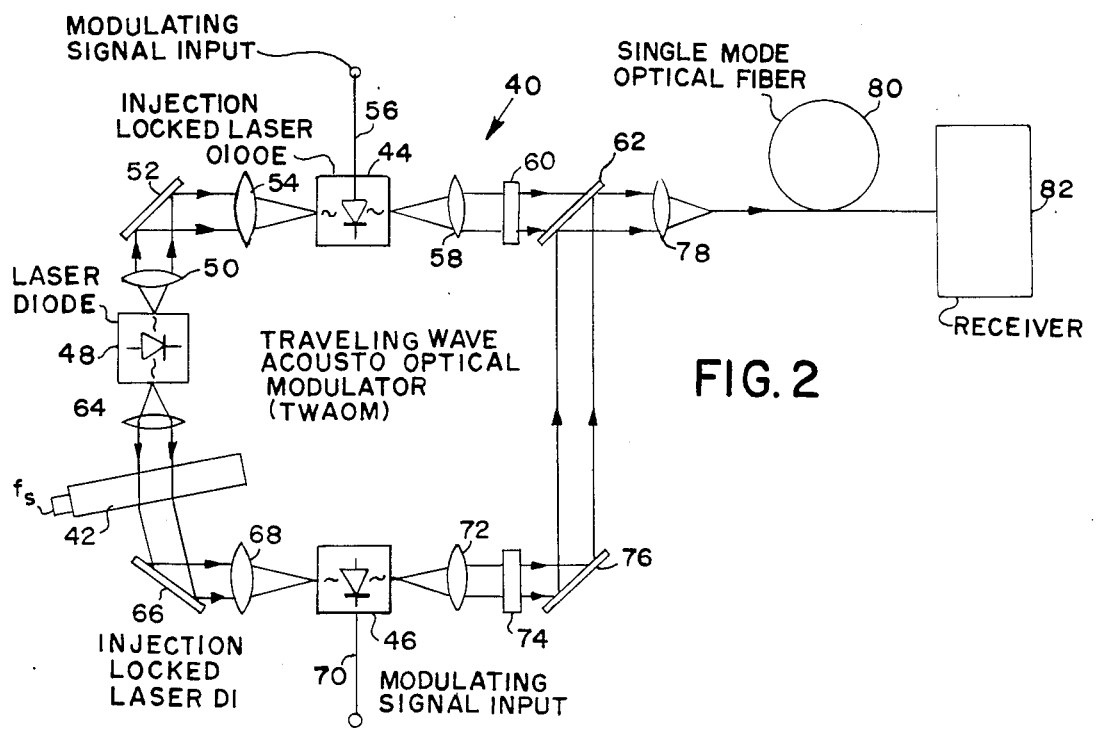
FIG. 2 is a schematic of an injection-locked laser modulator which provides an alternative embodiment for generating the optical carrier wave pairs of the present invention.

Referring to FIG. 2, an injection-locked laser modulator is generally illustrated at 40. The modulator 40 is used for subcarriers having a frequency of over 5 GHz. The modulator 40 is basically a Mach-Zehnder type modulator incorporating a Traveling-Wave-Acousto-Optical-Modulator (TWAOM) 42 and two injection-locked laser diodes 44 and 46. A first portion of the output from a laser diode 48 is collimated by a lens 50 onto a mirror 52 which reflects the optical beam to a focusing lens 54 which focuses the optical beam on the injection-locked laser diode 44. The injection-locked laser diode 44 receives a modulating signal input on line 56. The output from the injection-locked laser diode 44 is applied to a collimating lens 58 which directs it to wave front correcting optics 60 and then to a beam splitter 62.

A second portion of the output from the laser diode 48 is applied to a lens 64 which collimates the light into a beam and directs it to the TWAOM 42. The TWAOM 42 is driven at a very high frequency so that it is capable of inserting subcarriers up to several tens of GHz. The output from the TWAOM 42 is reflected by a mirror 66 to a focusing lens 68 which applies the output to the injection-locked laser diode 46. The injection-locked laser diode 46 receives a modulating signal input on line 70. The optical output from the injection-locked laser diode 46 is applied to a collimating lens 72 and through wave front correcting optics 74 to a mirror 76 for reflection to the beam splitter 62. The output from the beam splitter 62 is applied to a fiber optic coupler (lens) 78 which couples the optical wave into a single mode optical fiber 80 for transmission to a receiver 82.

In both of the embodiments illustrated in FIGS. 1 and 2, the information is modulated directly onto the laser beams and the high frequency subcarrier is generated separately. Therefore, the use of high frequency subcarriers is not limited by the frequency response of the laser diodes. An optical carrier wave pair is created whose frequency separation is determined by the frequency of the SWAOM 28 or TWAOM 42.

Figure 3:
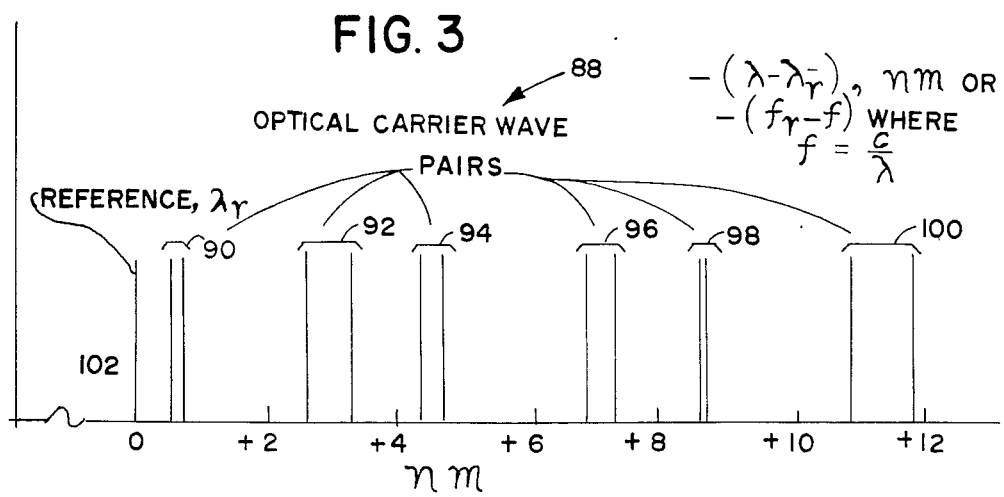
FIG. 3 is a graph showing the optical carrier wave pairs in accordance with the present invention assigned to predetermined frequency slots.

Referring to FIG. 3, a graph is designated at 88 showing six optical carrier wave pairs, designated as 90, 92, 94, 96, 98, and 100. Each of the six optical carrier wave pairs is located within a preassigned frequency or wavelength slot in accordance with the frequency or wavelength of the laser diodes and the SWAOM 28 or TWAOM 42. The exact frequency or wavelength locations of the optical carrier wave pairs is not significant as long as they remain within their assigned frequency slots. The wavelength $\lambda_r$, indicated as 102 in FIG. 3 is the reference wavelength, designated as zero.

If the separation between adjacent optical carrier wave pairs is properly controlled, the frequency spectrum for the optical carrier wave pairs can be made to coincide with the frequency spectrum described in co-pending patent application Ser. No. 720,658, filed Apr. 8, 1985 entitled, "Coherent Optical Fiber Communication With Frequency-Division-Multiplexing", in the name of the same applicants as the present invention and assigned to the same assignee. Preferably, the range for the frequency separation between adjacent optical carrier wave pairs is from about 300 GHz to about 600 GHz which corresponds to a wavelength separation of 1 to 2 nm as shown in FIG. 3.

Figure 4:
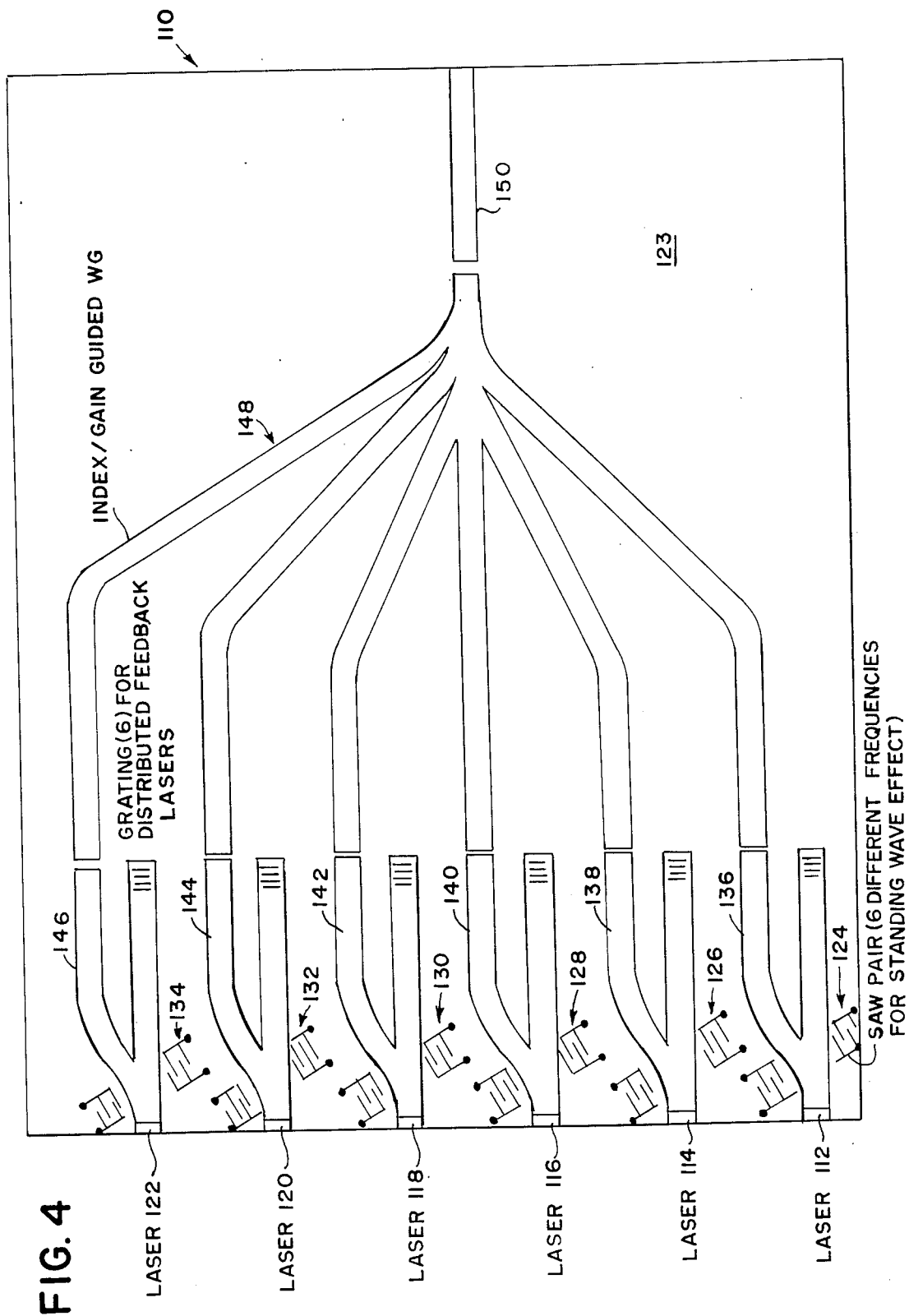
FIG. 4 is a schematic diagram showing the monolithic implementation of a FDM transmitter in accordance with the present invention.

Referring to FIG. 4, a monolithic implementation of an FM transmitter in accordance with the present invention in Opto-Electronic-Integrated-Circuit (OEIC) form is generally indicated at 110. Six semiconductor lasers 112 through 122, formed as part of integrated circuit chip 123, are employed to generate optical output beams. Each laser 112 through 122 has a pair of Surface-Acoustic-Wave transducers (SAWs) associated therewith and positioned adjacent the output of the lasers to produce the effect of a standing wave SAW (SWSAW). (The use of a SAW in monolithic form is equivalent to the use of an AOM in discrete optical component systems.) The pairs of SAW transducers are indicated at 124, 126, 128, 130, 132 and 134, respectively. Each output from the lasers 112 to 122 is converted to an optical carrier wave pair by the SAW pairs and directed through a curved waveguide associated with each laser designated 136, 138, 140, 142, 144 and 146, respectively. An optical combiner such as a star coupler 148 is aligned with the output of the waveguides 136, 138, 140, 142, 144 and 146 to combine the same into a multiplexed optical output beam. This multiplexed optical output beam is optically coupled to an optical amplifier section 150, such as a laser amplifier or a separate Raman fiber amplifier, which is further coupled to a single-mode optical fiber (not shown) for transmission of the optical carrier wave pairs. Each laser operates independently with the SWSAW's operating at six different frequencies.

Figure 5:
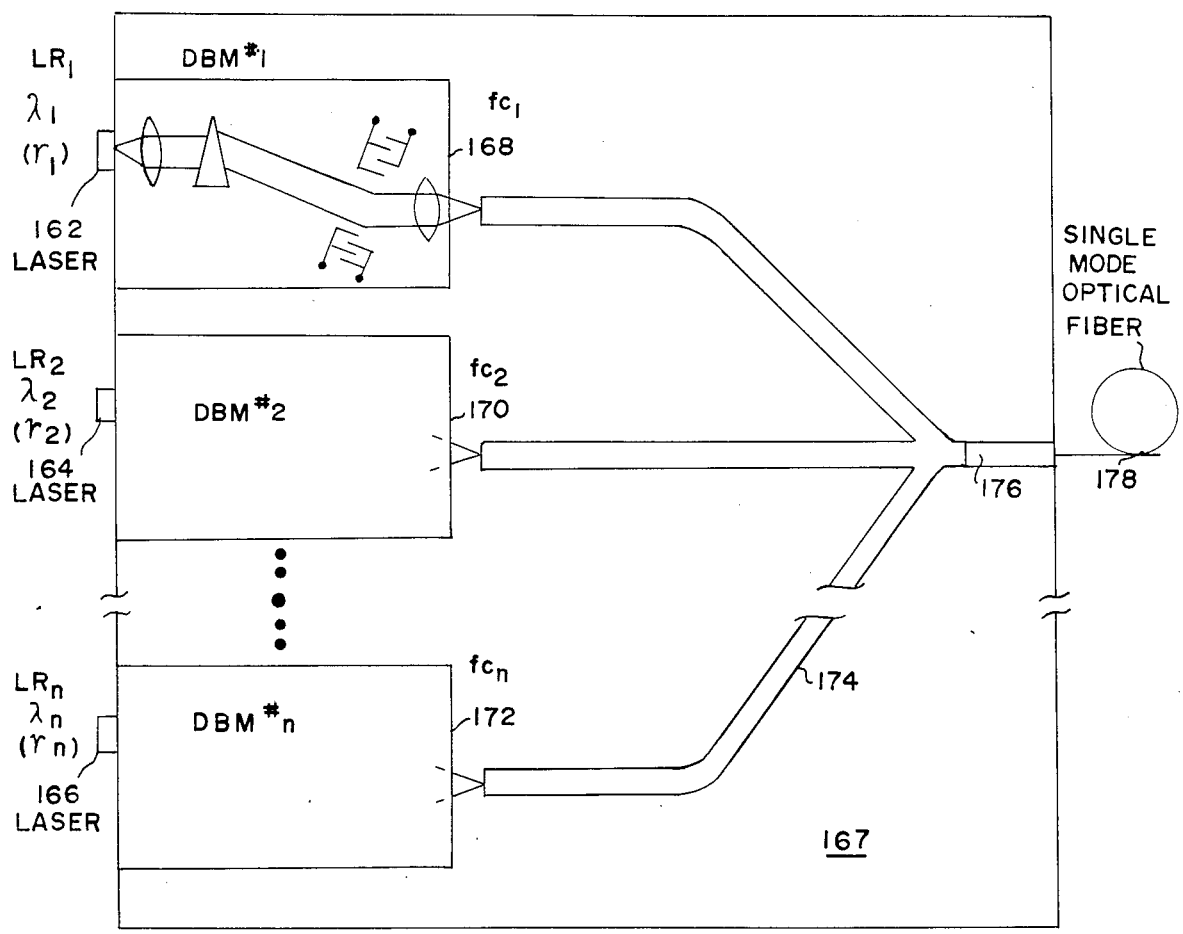
FIG. 5 is a schematic diagram showing a hybrid monolithic implementation of an FDM transmitter in accordance with the present invention.

However, with the monolithic implementation illustrated in FIG. 4 all the semiconductor lasers 112–122 are fabricated on the single integrated circuit chip or substrate 123, which may be GaAlAs. Therefore, some care must be taken to assure that their frequencies are not so close together as to cause spectral overlap. To avoid such a possibility, a hybrid implementation of an FDM transmitter in accordance with the present invention is illustrated in FIG. 5 as 160. The implementation in FIG. 5 is very similar to the implementation in FIG. 4 with the exception that the lasers 162, 164, 166 are mounted onto the substrate 167 separately. Therefore, the lasers $LR_1$ through $LR_n$ can be readily pretested to insure that their frequencies do not overlap.

The outputs of each of the lasers $LR_1$ through $LR_n$ are shifted by their respective SWSAW's within their respective DBM block, indicated as DBM#1, DBM#2 through DBM#n and then applied to a star coupler 174 and optically amplified by optical amplifier 176. The output of the optical amplifier 176 is optically coupled to a single-mode optical fiber 178 for transmission of the optical carrier wave pairs.

Referring to FIG. 6, an Opto-Electronic (OE) heterodyne receiver is indicated generally at 258. The incoming optical carrier wave pairs from the optical fiber 178 are focused by lens 252 onto an avalanche photo-detector 254. A negative DC bias voltage (V−) is applied to the avalanche photo-detector 254 and a high frequency voltage signal from a local oscillator 256 is superimposed on the DC bias voltage of the avalanche photo-detector 254. As a result of the avalanche gain non-linearity of the avalanche photo-detector 254, a beat frequency is produced between the incoming optical carrier wave pairs and the voltage signal from the local oscillator 256. A resonant transmission line 202 is utilized as the load for the avalanche photo-detector 254 to provide a standing wave pattern of the desired optical carrier pair frequencies or channels. These frequencies can be further decoupled from the transmission line 202 by the decoupling capacitors 204 through 212 illustrated in FIG. 6. Advantageously, the resonant transmission line 202 effectively neutralized the capacitance of the avalanche-photo detector 254. For low frequency operation, i.e., below 1 GHz, the resonant transmission line 202 can be replaced by serially connected parallel-resonant circuits, as desired. Moreover, since the subcarriers are produced externally and not by direct modulation of the lasers, subcarriers of very high frequencies (tens of GHz) can be readily produced. In this respect, the OE heterodyne receiver illustrated in FIG. 7 offers advantages relative to the direct detection method illustrated in FIG. 6, particularly at higher frequencies.

The conversion gain of an avalanche photo-detector can be estimated by calculating the current gain which is given by the empirical relationship:

$$M = 1/[1-(V/V_b)^n]$$

where $V_b$ is the breakdown voltage and V is the effective junction voltage. The parameter n has a value between 2.5 and 7 and is dependent upon the material employed. When an AC local oscillator voltage is superimposed on the DC bias voltage, the bias voltage has an AC component at the frequency of the local oscillator. Since V and therefore M change periodically with the local oscillator, M can be expanded into a Fourier series in the harmonics of local oscillator. The coefficient of the fundamental frequency is related to the conversion gain. The conversion gain is equal to ½ of the coefficient of the fundamental frequency. A maximum of 17% of the DC avalanche gain is possible. Since the avalanche photo-detection can have a gain as high as 10,000, a conversion gain of 1700 is possible.

Referring to FIG. 7, another heterodyne receiver for use with the present invention is generally illustrated at 280. The optical carrier wave pairs are transmitted along a single-mode optical fiber such as 178. The incoming optical beam is collimated by lens 282 and applied to a beam splitter 284. An optical local oscillator 286 generates a reference optical carrier wave pair which is collimated by lens 288 on the beam splitter 284. The output beam from the beam splitter 284 is focused by lens 290 and applied to an avalanche photo-detector 292. Since the reference optical carrier wave pair signal from the local oscillator 286 is much stronger than the incoming optical carrier wave pair signals, the avalanche photo-detector 292 is driven into its non-linear region, producing beat frequencies between the incoming optical carrier wave pairs signals and the reference optical carrier wave pair signal. A resonant transmission line indicated at 202, as shown in FIGS. 6 and 7, is utilized to provide the load for the avalanche photo-detector 292. The resonant transmission line 202 provides the standing wave pattern for the optical carrier wave pairs.

Referring to FIG. 8, the standing wave patterns for the various optical carrier wave pair frequency slots are illustrated in the graph designated as 300. The standing wave pattern for the 1 GHz optical carrier wave pair is designated 302; the standing wave pattern for the 3 GHz optical carrier wave pair is designated 304; the standing wave pattern for the 7 GHz optical carrier wave pair is designated 306; the standing wave pattern for the 9 GHz optical carrier wave pair is designated 308; the standing wave pattern for the 11 GHz optical carrier wave pair is designated 310; and the standing wave pattern for the 13 GHz optical carrier wave pair is designated 312. Many of the nodes, which correspond to the maximum amplitude of these standing waves, are connected to the coupling capacitors 204 through 212 as indicated in FIGS. 6 and 7. The dashed lines indicate the node position at which connections are made for the respective standing wave for the 1 and 3 GHz, 13 GHz, 11 GHz, 9 GHz, and 7 GHz carrier frequency slots, which are designated as 314, 316, 318, 320 and 322, respectively. These different carrier frequencies are selectively coupled out at the nodes 324, 326, 328, 330 and 332 where the amplitude of the respective standing wave is at a maximum. The separated or decoupled carrier frequencies can be further second (electronically) heterodyne detected and amplified, as desired.

The coupling capacitor 204-212 for each frequency are adjusted so that the resonant strip line 202 is properly loaded at the different frequencies and the Q for each frequency is close to optimum for selectively and information bandwidth. Advantageously, using a transmission line or resonant strip line 202 as the load for the photo-detectors 254 or 292, enables the capacitance of these photo-detectors to be neutralized by inductance trimming (not shown) or by adjusting the length of the resonant strip line 202 or both.

Figure 9:
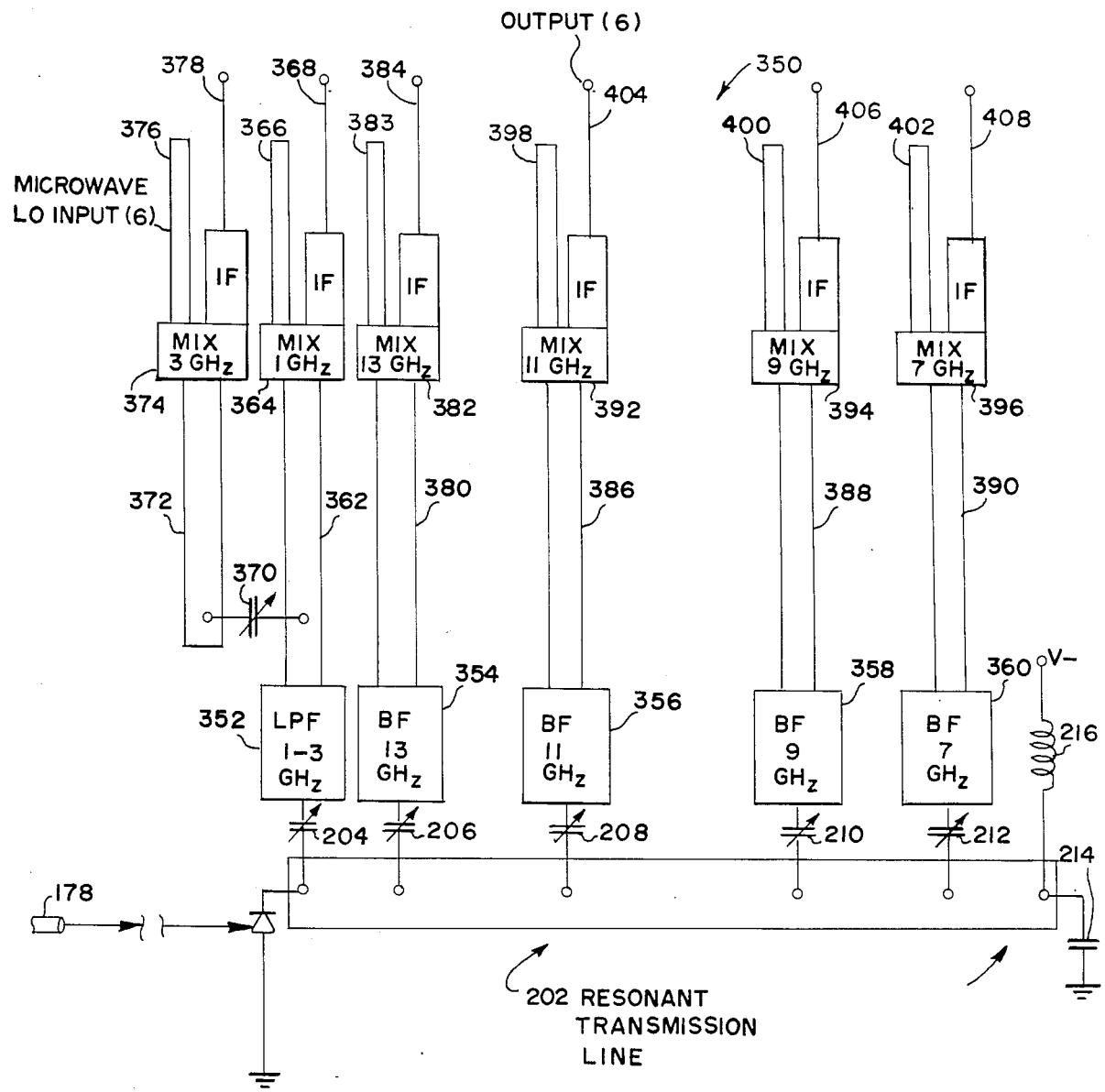
FIG. 9 is a detailed schematic diagram of a second (electronic) heterodyne detection system for use with the FDM receivers illustrated in FIGS. 6 and 7.

Referring to FIG. 9, a detailed schematic of a second (electronic) heterodyne detection receiver is illustrated generally as 350 with like numbered elements from FIGS. 6 and 7 retaining their same numerical designation. The six optical carrier frequencies or channels are decoupled from the transmission or resonant strip line 202 using a low pass filter 352 for the 1 and 3 GHz channels and band pass filters 354, 356, 358 and 360 for the 13 GHz, 11 GHz, 9 GHz and 7 GHz channels, respectively.

The low pass filter 352 is coupled to a resonant quarter-wave strip line 362 and to a 2 GHz microwave receiver 364 which receives its local oscillator input from another strip line 366. An appropriate IF output is obtained from output line 368. The strip line 362 is coupled by an adjustable capacitator 370 to another resonant quarter wave strip line 372 which is coupled to a 3 GHz microwave receiver 374 which receives its local oscillator input along strip line 376. An IF output (normally the same as that of the 1 GHz channel) is obtained from output line 378.

The band pass filter 354 is coupled to a resonant quarter-wave strip line 380 which is electrically coupled at its opposite end to a microwave receiver 382 for 13 GHz. The microwave receiver 382 receives its local oscillator input from strip line 383 and provides an IF output on output line 384. Likewise, band pass filters 356, 358 and 360 are coupled to quarter-wave resonant lines 386, 388 and 390, respectively, which are electrically coupled to microwave receivers 392, 394 and 396, respectively, which are tuned to receive 11 GHz, 9 GHz and 7 GHz, respectively. The microwave receivers 392, 394 and 396 receive their local oscillator inputs on strip lines 398, 400 and 402, respectively, and provide IF outputs on output lines 404, 406 and 408, respectively.

To generate the randomly spaced optical carrier wave pairs in accordance with the present invention, a double-beam-modulator 20 of the type illustrated in FIG. 1 may be used for frequencies up to 5 GHz and the injection-locked laser modulator 40 of the type illustrated in FIG. 2 may be used for higher frequencies. In FIG. 1, the optical output from the laser diode 22 is modulated by a SWAOM 28 to provide the desired subcarriers for the optical carrier wave pair. The subcarriers of the optical carrier wave pair are optically coupled to a single-mode optical fiber 32 for transmission and are detected by receiver 34. The SWAOM 28 up-shifts and down-shifts the incoming laser beam simultaneously so that the intensity of the resulting output beam is modulated at twice the driving frequency of the SWAOM 28. The digital or analog information is modulated directly on the laser beam by modulating the injection current applied to the laser diode 22 and the original optical carrier is suppressed.

As illustrated in FIG. 2, a TWAOM 42 is employed with two injection-locked lasers for inserting subcarriers up to several tens of GHz. Again, the information is modulated directly onto the resulting laser beams from modulating signal inputs 56 and 70. The high frequency subcarrier is generated separately by the TWAOM 42. The outputs from the laser diodes 44 and 46, are applied to a beam splitter 62 and focused by optical coupler 78 for transmission through the single-mode optical fiber 80 to a receiver 82.

With the modulation systems described in FIGS. 1 and 2, random optical carrier wave pairs are generated. The optical carrier wave pairs are located within preassigned frequency or wavelength slots in accordance with the frequency of the laser diodes and the frequency of the SWAOM 28 or TWAOM 42. Their exact locations are not important as long as they do not wander out of the preassigned frequency or wavelength slots. However, the frequencies of the laser diodes should be far enough apart to preclude spectral overlap. In the infrared region of one micrometer wavelength, a one nanometer difference represents a 300 GHz separation between adjacent optical carrier wave pairs which is sufficient. Preferably, the frequency separation between adjacent optical carrier wave pairs is from about 300 GHz to about 600 GHz. A typical optical carrier wave pair slot assignment is shown in FIG. 3.

FIG. 4 illustrates a monolithic implementation using pairs of SAW's having different frequencies to provide a standing wave effect similar to that which is obtained when using a SWAOM 28 with discrete components. The outputs from the lasers 112-122 are combined in a star coupler 148 and amplified by optical amplifier 150, e.g., having a bandwidth of approximately 10 nanometers, before being applied to a single mode optical fiber 178.

In FIG. 5 a hybrid implementation is illustrated using discrete and monolithic components. The lasers 162, 164 and 166 are separately mounted on the substrate 160 to allow for pretesting to assure that their frequencies are sufficiently separated to prevent spectral overlap.

Referring to FIG. 6, the opto-electronic (OE) heterodyne detection system 258 illustrated therein eliminates the need for the multiplicity of optical local oscillators by employing an avalanche photo-detector 254 with an electronic local oscillator 256 having a high frequency voltage output. The non-linearity of the avalanche gain in the presence of the high frequency bias voltage produces a beat frequency between the output of the local oscillator 256 and the incoming optical carrier wave pairs which are incident on the photo-detector 254. A microwave spectrum in the form of standing wave patterns for the optical carrier wave pairs is then provided along the resonant strip line 202.

In FIG. 7, the photo-detector 292 employed has a gain or conversion efficiency which is non-linear with light intensity. The incoming carrier wave pairs (signal) are combined with a local oscillator optical carrier wave pair from optical local oscillator 286. The optical carrier wave pair drives the photo-detector into a non-linear response to produce beat frequencies between the optical carrier wave pairs, each on a subcarrier, and the local optical carrier wave pair also on a subcarrier. The standing wave patterns which result from using the quarter-wave strip line 202 are illustrated in FIG. 8. The respective frequency channels are recovered at the nodes 324, 326, 328, 330, and 332 where the amplitudes of the standing waves are at a maximum. These nodes correspond to the locations of the coupling capacitors 204, 206, 208, 210 and 212, as shown in FIGS. 6, 7 and 9.

Finally, a second or electronic heterodyne detection may be accomplished in accordance with the receiver 350 illustrated in FIG. 9. The adjustable coupling capacitors 204 through 212 are coupled to the low pass filter 352 to filter out the 1 and 3 GHz channels and band pass filters 354 through 360, respectively, for filtering out the 7, 9, 11 and 13 GHz frequency channels. Additional quarter-wave resonant transmission lines 362, 372, 380 and 386 through 390 couple the filters to microwave receivers 364, 374, 382, 392, 394, and 396, respectively. Further, the resonant strip line 362 coupling the low pass filter 352 to the receiver 364 is coupled by an adjustable coupling capacitor 370 to another strip line 372 which is electrically coupled to the receiver 374. The local oscillator inputs to the microwave receivers 364, 374, 382, 392, 394 and 396 are received through resonant strip lines 366, 376, 383 and 398–402 coupled thereto. The outputs in the form of the six electrical IF frequencies are received along output lines 368, 378, 384 and 404 through 408.

The method and system of the present invention offers a novel and economical FDM system in which broadband analog and digital information can be transmitted simultaneously. A LAN employing the present invention can be operated at relatively low bit rates and still handle large traffic by selectively using the many available channels. Further, the proposed FDM system can be made compatible with existing LAN cable systems so that many LANs can be effectively operated in parallel to handle heavy traffic. Advantageously, the present invention may be used to support graphic displays on ordinary computer terminals. Since the optical channels can be used independently of one another, one channel can be used for digital information exchanges between a terminal and a host computer and another channel for broadband analog transmission. Since graphic terminals are complicated and costly, their cost may not be justified for occasional use. However, by using the FDM system of the present invention, digital instructions can be sent over one of the channels corresponding to an optical carrier wave pair to the host computer for generation of the graphics. The resulting video signals from the host computer, which require large information bandwidth, can be sent back to the terminal via a broadband channel which is on another channel corresponding to another optical carrier wave pair. In this way, the LAN can provide graphic capability to all users without graphic terminals. Presently, such an approach cannot be economically implemented with conventional cable systems.

It should be understood by those skilled in the art that various modifications may be made in the present invention. For example, a reference wave may be provided for each optical carrier wave pair. However, if a subcarrier is included in the form of a reference wave the reference wave must be sent with the optical information beam from the laser diode. Direct modulation of a laser with a carrier is not suitable for high carrier frequencies at present because of the limited frequency response of laser diodes. Such modifications should not be considered as departing from the spirit and scope of the present invention as described in the description and defined in the appended claims.

What is claimed is:

1. A method of providing multi-channel transmission of digital and broadband video information in an optical fiber local area network through frequency-division-multiplexing, comprising the steps of:
   generating a plurality of closely spaced optical carrier wave pairs with the optical carrier waves within each optical carrier wave pair having a predetermined separation frequency between one another, the separation frequency between the two optical carriers within each optical carrier wave pair being different for each optical carrier wave pair;
   assigning each of the plurality of optical carrier wave pairs to a predetermined frequency slot; and
   optically combining the plurality of optical carrier wave pairs to provide a multiplexed optical output wave.

2. The method recited in claim 1, wherein:
   the frequency separation between the two optical carriers within each optical carrier wave pair can vary up to several tens of GHz.

3. The method recited in claim 1, wherein:
   the frequency slots are assigned so that the separation between adjacent optical carrier wave pairs is on the order of at least 300 GHz to 600 GHz.

4. The method recited in claim 1, wherein:
   each of the plurality of optical carrier wave pairs is generated independently of one another.

5. The method recited in claim 1, wherein:
   the assigning step is accomplished by operating a plurality of transmitting lasers at slightly different frequencies to avoid spectral overlap.

6. The method recited in claim 5, wherein:
   the step of generating the optical carrier wave pairs is accomplished by a plurality of standing-wave-surface-acoustic-wave transducers operating at different frequencies which are positioned to deflect the frequencies of output laser beams from the transmitting lasers to provide the plurality of optical carrier wave pairs.

7. The method recited in claim 1, including the step of:
   optically amplifying the multiplexed optical output wave.

8. The method recited in claim 1, wherein:
   the optical carrier wave pairs are used for simultaneous digital information transmission.

9. The method recited in claim 1, wherein:
   the optical carrier wave pairs are used for simultaneous analog information transmission.

10. The method recited in claim 1, wherein:
    the optical carrier wave pairs are used for simultaneous digital and analog information transmission.

11. A method of providing multi-channel transmission of digital and broadband video information in an optical fiber local area network through frequency-division-multiplexing, comprising the steps of:
    generating a plurality of closely spaced optical carrier wave pairs with the optical carrier waves within each optical carrier wave pair having a predetermined separation frequency between one another;

assigning each of the plurality of optical carrier wave pairs to a predetermined frequency slot;

opto-electronic heterodyne detecting the frequencies of the optical carrier wave pairs; and optically combining the plurality of optical carrier wave pairs to provide a multiplexed optical output wave.

12. The method recited in claim 11, wherein the opto-electronic heterodyne detecting step includes:

superimposing a high frequency voltage on a DC bias voltage of an avalanche photo-diode to provide beat frequencies between the plurality of optical carrier wave pairs and the high frequency voltage.

13. The method recited in claim 11, wherein the opto-electronic heterodyne detecting step includes:

generating a local optical carrier wave pair; and combining the incoming optical carrier wave pairs with the local optical carrier wave pair to generate beat frequencies between the incoming optical carrier wave pairs and the local optical carrier wave pair.

14. A method for providing multi-channel transmission of digital and broadband video information in an optical fiber local area network through frequency-division-multiplexing, comprising the steps of:

independently generating a plurality of closely spaced optical carrier wave pairs with the optical carrier waves within each optical carrier wave pair having a predetermined separation wavelength between one another of between a fraction of a nanometer up to approximately one nanometer and in which the wavelength separation between the two optical carriers within each optical carrier wave pair is different for each optical carrier wave pair;

assigning each of the plurality of optical carrier wave pairs to a predetermined frequency slot;

optically combining the plurality of optical carrier wave pairs to provide a multiplexed output wave; and the step of generating the optical carrier wave pairs is accomplished by a plurality of standing-wave-surface-acoustic-wave transducers operating at different frequencies which are positioned to deflect the frequencies of output laser beams from transmitting lasers to provide the plurality of optical carrier wave pairs.

15. The method recited in claim 14, including the step of:

opto-electronic heterodyne detecting the frequencies of the optical carrier wave pairs.

16. The method recited in claim 15 wherein the opto-electronic heterodyne detecting step includes:

superimposing a high frequency voltage on a DC bias voltage of an avalanche photo-diode to provide beat frequencies between the plurality of optical carrier wave pairs and the high frequency voltage.

17. The method recited in claim 15 wherein the opto-electronic heterodyne detecting step includes:

generating a local optical carrier wave pair; and combining the incoming optical carrier wave pairs with local optical wave pair to generate beat frequencies between the incoming optical carrier wave pairs and the local optical carrier wave pair.

18. A frequency-division-multiplexing system for providing an optical fiber local area network (LAN) with multi-channel transmission of digital and broadband video information, comprising:

means for generating a plurality of closely spaced optical carrier wave pairs with the optical carrier waves within each optical carrier wave pair having a predetermined separation frequency between one another;

means for assigning each of the plurality of optical carrier wave pairs to a predetermined frequency slot;

means for optically combining the plurality of optical carrier wave pairs to provide a multiplexed optical output wave;

means for opto-electronic heterodyne detecting the frequency of the optical carrier wave pairs, said opto-electronic heterodyne detecting means including an avalanche photo-diode, a DC voltage source coupled to said avalanche photo-diode to supply a DC bias voltage thereto, means for superimposing a high frequency voltage on the DC bias voltage to provide beat frequencies between the plurality of optical carrier wave pairs and the high frequency voltage when the optical carrier wave pairs are detected by said avalanche photo-diode; and optical amplifying means optically coupled to said optical combining means.

19. The system recited in claim 18, wherein:

said generating means provides a frequency separation between the two optical carriers within each optical carrier wave pair of up to several tens of GHz.

20. The system recited in claim 18, wherein:

the frequency slots of said assigning means provide a separation between adjacent optical carrier wave pairs on the order of at least 300 GHz to 600 GHz.

21. The system recited in claim 18, wherein:

said generating means includes means for providing a different separation frequency between the two optical carriers within each optical carrier wave pair.

22. The system recited in claim 18, wherein:

said generating means includes a plurality of lasers for generating each of said optical carrier wave pairs independently of one another.

23. The system recited in claim 22, wherein:

said generating means includes a plurality of standing-wave-surface-acoustic-wave transducers operating at different frequencies, said standing-wave-surface-acoustic-wave transducers being positioned relative to said lasers to shift the frequencies of output laser beams from the lasers upwardly and downwardly to provide the plurality of optical carrier wave pairs.

24. The system recited in claim 18, wherein:

said optical carrier wave pairs are used for simultaneous digital information transmission.

25. The system recited in claim 18, wherein:

said optical carrier wave pairs are used for simultaneous analog information transmission.

26. The system recited in claim 18, wherein:

said optical carrier wave pairs are used for simultaneous digital and analog transmission.

27. A frequency-division-multiplexing system for providing an optical fiber local area network (LAN)

with multi-channel transmission of digital and broadband video information, comprising:

means for generating a plurality of closely spaced optical carrier wave pairs with the optical carrier waves within each optical carrier wave pair having a predetermined separation frequency between one another;

means for assigning each of the plurality of optical carrier wave pairs to a predetermined frequency slot;

means for optically combining the plurality of optical carrier wave pairs to provide a multiplexed optical output wave;

means for opto-electronic heterodyne detecting the frequency of the optical carrier wave pairs, said opto-electronic heterodyne detecting means including an optical local oscillator for generating local optical carrier wave pairs to provide beat frequencies between the optical carrier wave pairs from said generating means and the local optical carrier wave pairs; and optical amplifying means optically coupled to said optical combining means.

28. A frequency-division-multiplexing system for providing an optical fiber local area network (LAN) with multi-channel transmission of digital and broadband video information, comprising:

means for generating a plurality of closely spaced optical carrier wave pairs with the frequencies of optical carrier waves within each optical carrier pair having a predetermined separation frequency between one another;

said generating means providing a wavelength separation between the two optical carriers within each carrier wave pair of between a fraction of a nanometer up to approximately one nanometer;

said generating means including a plurality of lasers for generating each of said optical carrier wave pairs independently of one another;

said generating means including means for providing a different frequency separation between the two optical carriers within each optical carrier wave pair;

means for assigning each of the plurality of optical carrier wave pairs to a predetermined frequency slot, the frequency slots of said assigning means providing a separation between adjacent optical carrier wave pairs on the order of at least one to two nanometers;

means for optically combining the plurality of optical carrier wave pairs to provide a multiplexed optical output wave; and means for opto-electronic heterodyne detecting the frequency of the optical carrier wave pairs.

29. The system recited in claim 28 wherein:

said generating means includes a plurality of standing-wave-surface-acoustic-wave transducers operating at different frequencies, said standing-wave-surface-acoustic-wave transducers being positioned relative to said lasers to shift the output laser beams from the lasers upwardly and downwardly to provide the plurality of optical carrier wave pairs.

30. The system recited in claim 28, wherein:

said optical carrier wave pairs are used for simultaneous digital information transmission.

31. The system recited in claim 28, wherein:

said optical carrier wave pairs are used for simultaneous analog information transmission.

32. The system recited in claim 28, wherein:

said optical carrier wave pairs are used for simultaneous digital and analog information transmission.

33. The system recited in claim 28, wherein:

said opto-electronic heterodyne detecting means includes an avalanche photo-diode, a DC voltage source coupled to said avalanche photo-diode to supply a DC bias voltage thereto, means for superimposing a high frequency voltage on the DC bias voltage to provide beat frequencies between the optical carrier wave pairs and the high frequency voltage when the optical carrier wave pairs are detected by said avalanche photo-diode.

34. The system recited in claim 28, wherein:

said opto-electronic heterodyne detecting means includes an optical local oscillator for generating local optical carrier wave pairs to provide beat frequencies between the optical carrier wave pairs from said generating means and the local optical carrier wave pairs.

35. The system recited in claim 28, including:

optical amplifying means optically coupled to said optical combining means.

* * * * *